Jan. 7, 1964     W. ZDAN     3,117,222

FUNCTION GENERATOR

Filed June 16, 1960

INVENTOR
WILLIAM ZDAN
BY
ATTORNEY 3,117,222
FUNCTION GENERATOR
William Zdan, New Hyde Park, N.Y., assignor to Sperry Rand Corporation, Great Neck, N.Y., a corporation of Delaware
Filed June 16, 1960, Ser. No. 36,660
1 Claim. (Cl. 235—197)

This invention relates to means for obtaining resolved data as well as three wire synchro data from the output of a three wire synchro transmitter. It also relates to means for obtaining a cosine function from the output of a synchro transmitter without requiring a resolver per se.

In the past, when resolved data such as sine and cosine information was required together with three wire synchro transmission data, a resolver and a synchro transmitter were attached to the output control shaft of a sensor or computing mechanism. If only three wire synchro information was available, a position servo was required to drive the resolver. By means of the present invention, the desired resolved information is obtained without the necessity of adding a position servo and/or a resolver by electronically generating it from the three wire synchro output. The present invention requires only a few additional small components resulting in considerable savings in weight, size, complexity and cost while providing an extremely reliable and accurate output.

It is a primary object of the present invention to provide simple reliable means for obtaining resolved data from the output of a three wire synchro transmitter.

It is an additional object of the present invention to provide resolved data from the output of a three wire synchro transmitter with a minimum of additional equipment.

It is a further object of the present invention to provide from a three wire synchro transmitter the usual three wire synchro data and resolved data by simple additional electrical means.

It is another object of the present invention to provide from the output of a three wire synchro transmitter a cosine function of its input.

The above objects of the present invention are obtained in a preferred embodiment of the invention by means dividing in half the output voltage of a three wire synchro transmitter that is representative of the sine of the angle through which the rotor is rotated. This half voltage is added to the output voltage of the synchro that is representative of the sine of the sum of 120° plus the angle through which the rotor is rotated. The summation of these two voltages is then representative of the cosine of the angle through which the rotor is rotated. Thus, the output of the synchro provides signals representative of resolved data, i.e., the sine and cosine of the angle through which the rotor has been rotated as well as the usual three wire synchro output data or any combination thereof.

These and other objects and advantages of the present invention will become more apparent from the following description with reference to the accompanying drawings, in which.

Figure 1:
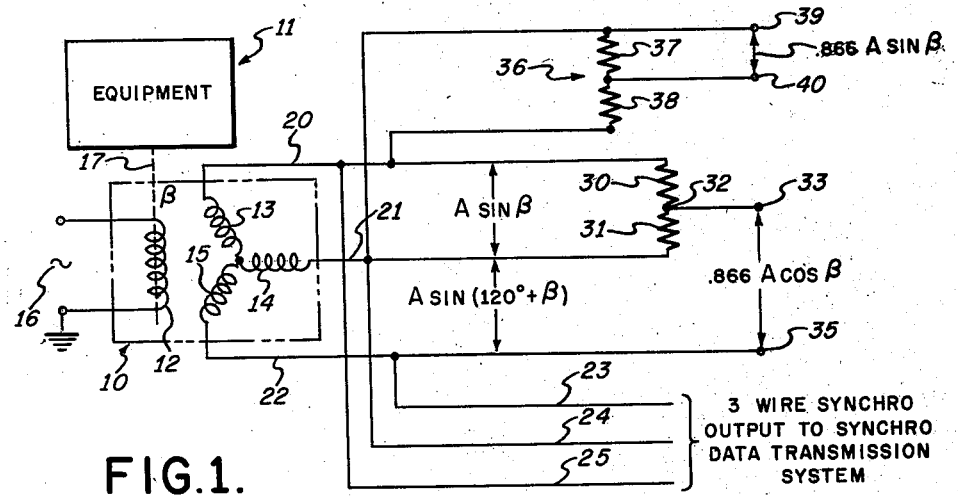
FIG. 1 is a wiring schematic of a three wire synchro transmitter utilizing an embodiment of the invention.

Referring now to FIG. 1, a conventional three wire synchro transmitter 10 is normally used to transmit position data in sensor, computer and other equipment generally indicated at 11 by means of a synchro data transmission system, not shown. The synchro transmitter 10 has a rotor winding 12 and three stator windings 13, 14 and 15, the latter being connected together in a Y configuration for purposes of example. The rotor winding 12 is energized by an A.C. excitation source 16. The rotor winding 12 is connected to be rotated in accordance with the position of the control shaft 17 of the equipment 11. The angle through which the shaft 17 and the rotor 12 rotates is equal to $\beta$.

The stator windings 13, 14 and 15 are connected to output leads 20, 21 and 22, respectively thereby providing electrical data representative of the position of the rotor 12 in the form of a conventional synchro three wire output. This three wire output data may be utilized in a synchro data transmission system by connecting one end of leads 23, 24 and 25 to leads 20, 21 and 22 respectively and connecting the other end of the leads 22, 23 and 24 to a synchro data transmission system, indicated by the legend.

Figure 2:
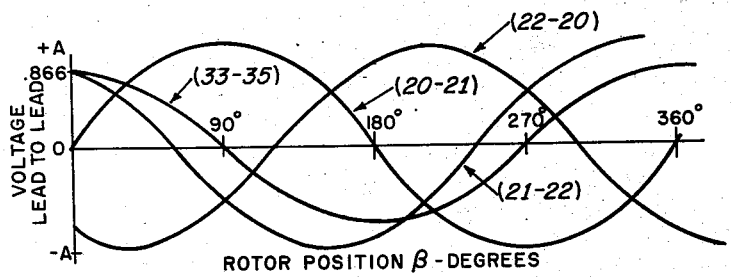
FIG. 2 is a graph showing the relationship of the output voltage between each pair of leads of the synchro output with respect to the rotor angle $\beta$.

With the synchro 10 aligned in accordance with conventional Aeronautical Radio Inc. (ARINC) procedures, the voltages appearing between the leads 20, 21 and 22 are as shown in the graph of FIG. 2 for each angular position $\beta$ of the rotor 12. From this graph it can be seen that the voltages appear between the output leads 20, 21 and 22 are as follows:

Between leads 20 and 21 = $A \sin \beta$
Between leads 21 and 22 = $A \sin (120+\beta)$
Between leads 22 and 20 = $A \sin (240+\beta)$ where A is the amplitude depending upon the amplitude of the excitation voltage 16.

From the above it can be seen that conventional three wire synchro transmission data is available on leads 23, 24 and 25 while resolved data in the form of sine information is available across leads 20 and 21.

To provide resolved data in the form of cosine information requires dividing the voltage across leads 20 and 21 by two and adding the quotient to the voltage existing across leads 21 and 22. Dividing the voltage across the leads 20 and 21 in half is accomplished by connecting the ends of series connected equal resistors 30 and 31 to the ends of leads 20 and 21 respectively. The voltage at the junction 32 of the resistors 30 and 31 is then equal to $$\tfrac{1}{2}A \sin \beta$$

and this voltage becomes available on output terminal 33 by connecting it to the junction 32 by lead 34. An output terminal 35 is connected to the end of lead 22.

The summation of the voltages from terminal 33 to terminal 35 is then $$\tfrac{1}{2}A \sin \beta + A \sin (120+\beta)$$

which may be expanded to $$\tfrac{1}{2}A \sin \beta + A \sin 120 \cos \beta + A \cos 120 \sin \beta$$

which equals $$\tfrac{1}{2}A \sin \beta + .866A \cos \beta - \tfrac{1}{2}A \sin \beta$$

or $$.866A \cos \beta$$

Thus, the voltage existing across terminals 33 and 35 is a cosine function of the angle $\beta$ through which the rotor winding 12 has been rotated having a maximum amplitude of .866 A.

To make the maximum amplitude of the sine function across leads 20 and 21 equal to the maximum amplitude of the cosine function across the terminals 33 and 35 in order to provide equivalent resolver data information from the synchro 10, a voltage dividing network 36 may be utilized. The voltage divider 36 serves to reduce the maximum amplitude of the signal appearing across the leads 20 and 21 in order to provide an output voltage which is $.866 A \sin \beta$.

The voltage divider 36 consists of series connected resistors 37 and 38 connected across the leads 20 and 21. Of the total resistance provided by the resistors 37 and 38, resistor 37 provides 86.6 percent while resistor 38 provides 13.4 percent. By connecting output terminals 39 and 40 to the upper and lower ends of the resistor 37, a voltage is obtained across the terminals 39 and 40 having a maximum amplitude equal to .866 A which is equivalent to the maximum output across terminals 33 and 35 of .866 A thereby providing resolved data in the form of $\sin \beta$ and $\cos \beta$ as well as conventional three wire synchro data.

Figure 3:
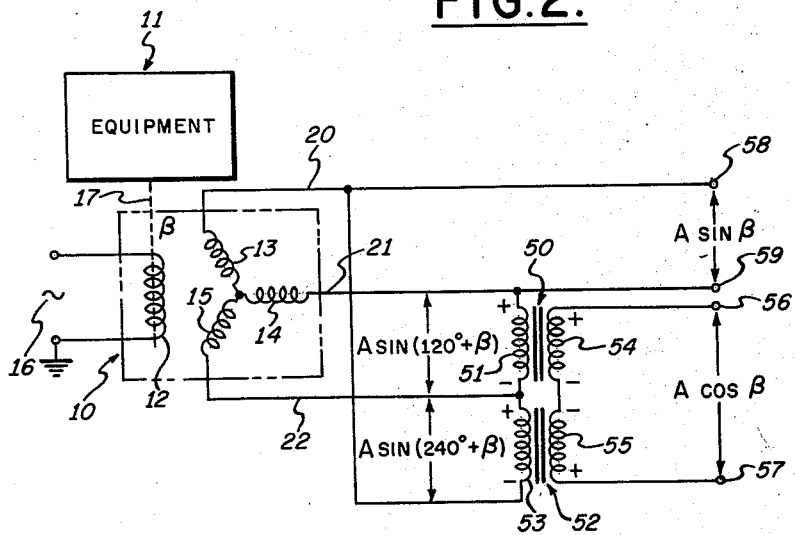
FIG. 3 is a wiring schematic of a three wire synchro transmitter utilizing an alternative embodiment of the invention.

Referring now to FIG. 3, wherein like reference characters indicate like elements, another means for generating the cosine function from the synchro 10 is shown. A transformer 50 has the upper and lower ends of its primary 51 connected to the leads 21 and 22 respectively. A transformer 52 has the upper and lower ends of its primary 53 connected to the junction of the lower end of the primary 51 from the lead 22 and to the lead 20 respectively. The primaries 51 and 53 are connected in series aiding while the secondaries 54 and 55 of the transformers 50 and 52 respectively are connected in series opposition. The transformers 50 and 52 have a step down ratio of 1.732 to 1. The output voltage from the secondary 54 of the transformer 50 is in phase with the input to its primary 51 while the output voltage from the secondary 55 of the transformer 52 is 180° out of phase with respect to the input to its primary 53.

Output terminals 56 and 57 are connected to the upper and lower ends of the primaries 54 and 55 respectively in order that the voltage across the terminals 56 and 57 is the algebraic summation of the two output voltages of the secondaries 54 and 55 which is equal to $$\frac{1}{1.732}A \sin (120+\beta) - \frac{1}{1.732}A \sin (240+\beta)$$

$$= \frac{.866}{1.732}A \cos \beta - \frac{.5}{1.732}A \sin \beta$$

$$+ \frac{.866}{1.732}A \cos \beta + \frac{.5}{1.732}A \sin \beta$$

$$= \frac{1.732}{1.732}A \cos \beta$$

$$= A \cos \beta$$

Output terminals 58 and 59 are connected to the ends of the leads 20 and 21 respectively. Thus, resolved data is obtained from the synchro 10 in the form of signals representative of $A \sin \beta$ and $A \cos \beta$ across the output terminals 58, 59 and the output terminals 56, 57 respectively.

If the synchro 10 is not aligned in accordance with ARINC procedures, a similar technique to that described above can be used to provide a resolver data. For instance, if the synchro 10 is aligned to produce a voltage across leads 20 and 21 of $A \cos \beta$ then the line-to-line voltages will be as follows:

$$20-21 = A \cos \beta$$
$$21-22 = A \cos (120+\beta)$$
$$22-20 = A \cos (240+\beta)$$

Using the apparatus of the embodiment shown in FIG. 1, the voltage across the output terminals 33 and 35 is then $$\tfrac{1}{2} A \cos \beta + A \cos (120+\beta)$$
$$= \tfrac{1}{2} A \cos \beta + A \cos 120 \cos \beta - A \sin 120 \sin \beta$$
$$= \tfrac{1}{2} A \cos \beta - \tfrac{1}{2} A \cos \beta - .866 A \sin \beta$$
$$= -.866 A \sin \beta$$

Using the alternative apparatus shown in FIG. 3, the voltage across the output terminals 56 and 57 is then $$\frac{1}{1.732}A \cos (120+\beta) - \frac{1}{1.732}A \cos (240+\beta)$$

$$= -\frac{.5}{1.732}A \cos \beta - \frac{.866}{1.732}A \sin \beta$$

$$+ \frac{.5}{1.732}A \cos \beta - \frac{.866}{1.732}A \sin \beta$$

$$= -A \sin \beta$$

From the above it can be seen that both sine and cosine functions can be made available by means of the present invention from a three wire synchro transmitter by simple additional equipment.

While the invention has been described in its preferred embodiments, it is to be understood that the words which have been used are words of description rather than of limitation and that changes within the purview of the appended claim may be made without departing from the true scope and spirit of the invention in its broader aspects.

What is claimed is:

Apparatus for providing resolved data from a three wire synchro transmitter comprising a synchro transmitter having a rotor and a stator, said rotor being excited by an A.C. excitation source, means for rotating said rotor relative to said stator, said stator including three connected windings having first, second and third output leads connected respectively thereto and being so constructed and arranged that the voltage between said first and second output leads is representative of the sine of the angle through which the rotor is rotated and the voltage between said second and third leads is representative of the sine of the sum of 120° plus the angle through which the rotor is rotated and the voltage between said first and third leads is representative of the sine of the sum of 240° plus the angle through which the rotor is rotated, first and second transformers having first and second primaries and first and second secondaries respectively, said first primary being connected to said second and third leads, said second primary being connected to said first and third leads, said first and second primaries being connected in series aiding, said first and second secondaries being connected in series opposition, and first and second output terminals connected to said first and second secondaries, respectively for providing a signal at said output terminals representative of the cosine of the angle through which the rotor is rotated.

References Cited in the file of this patent

"Servomechanism Analysis" (Thaler and Brown), pub. by McGraw-Hill, 1953 (p. 342, fig. B.4–b relied on).

"Servomechanism Practice" (Ahrendt), published by McGraw-Hill, 1954 (p. 50, fig. 3–25 relied on).